(12) United States Patent
Blosco et al.

(10) Patent No.: US 9,137,750 B2
(45) Date of Patent: *Sep. 15, 2015

(54) REDUCING POWER CONSUMPTION ON MULTI-TRANSMITTER DEVICES

(71) Applicant: Cisco Technology, Inc., San Jose, CA (US)

(72) Inventors: John Blosco, Norton, OH (US); Stephen Joseph McCarthy, Norton, OH (US); Corey Metsker, Clinton, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/134,520

(22) Filed: Dec. 19, 2013

(65) Prior Publication Data

US 2014/0105092 A1 Apr. 17, 2014

Related U.S. Application Data

(63) Continuation of application No. 12/436,693, filed on May 6, 2009, now Pat. No. 8,706,060.

(51) Int. Cl.
*H04B 1/04* (2006.01)
*H04W 52/02* (2009.01)
*H04W 88/08* (2009.01)

(52) U.S. Cl.
CPC ...... *H04W 52/0206* (2013.01); *H04W 52/0258* (2013.01); *H04W 88/08* (2013.01); *Y02B 60/50* (2013.01)

(58) Field of Classification Search
CPC ... H04L 12/10; H04L 12/40045; G06F 1/266; H04W 52/0206; H04W 88/08; H04W 52/0258
USPC ........................................ 455/114.2, 103, 129
See application file for complete search history.

(56) References Cited

U.S. PATENT DOCUMENTS

| 7,659,701 | B1 * | 2/2010 | Metsker et al. | 323/266 |
| 8,706,060 | B2 * | 4/2014 | Blosco et al. | 455/103 |
| 2008/0005600 | A1 * | 1/2008 | Diab et al. | 713/300 |

OTHER PUBLICATIONS

U.S. Appl. No. 11/677,812, filed Feb. 22, 2007, Metsker et al.
IEEE Computer Society, 802.3af IEEE Standards, Part 3: Carrier Sense Multiple Access with Collision Detection (CSMA/CD) Access Method and Physical Layer Specification, Item 1 Continued: Jun. 2003, Section 33.3.5.4.

* cited by examiner

*Primary Examiner* — Christian Hannon
(74) *Attorney, Agent, or Firm* — Patterson & Sheridan, LLP

(57) ABSTRACT

In an example embodiment, there is disclosed an apparatus comprising a first transmitter, a second transmitter, and logic coupled to the first transmitter and the second transmitter. The logic is operable to limit a time period the second transmitter is able to transmit while the first transmitter is transmitting.

20 Claims, 4 Drawing Sheets

REDUCING POWER CONSUMPTION ON MULTI-TRANSMITTER DEVICES

CROSS REFERENCE TO RELATED APPLICATIONS

This continuation application claims the benefit of U.S. patent application Ser. No. 12/436,693 filed on May 6, 2009.

TECHNICAL FIELD

The present disclosure relates generally to power consumption and, more particularly, to reducing power consumption on multi-transmitter devices.

BACKGROUND

The evolving Institute of Electrical and Electronics Engineers (IEEE) 802.11 standard for implementing wireless networks now incorporates multiple spectrum bands. Multiple input-multiple output (MIMO) access points with multiple transmitters corresponding to the multiple spectrum bands have been developed to address the evolving standard. Having multiple transmitters increases the link reliability of an access point, as well as the data rate. However, a MIMO access point requires higher levels of DC power to support the extra transmitters.

When the DC power supply is limited, effective operation of a MIMO access point becomes challenging. For example, a reduction in power supplied to a transmitter results in a lower effective throughput for the transmitter. A reduction in power supplied to a transmitter may also negatively impact the signal linearity, which results in lower antenna gain and, in turn, reduces the access point's range. Power-over-Ethernet (PoE) is one example in which the power supplied to an access point may be limited. In such a case, the transmitters of the access point share a limited amount of power supplied over the Ethernet cable. DC power consumption by a MIMO access point peaks when multiple transmitters are transmitting at the same time. Thus, when multiple transmitters of a MIMO access point receive limited power over an Ethernet cable and attempt to transmit simultaneously, each transmitter may experience a reduction in power.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
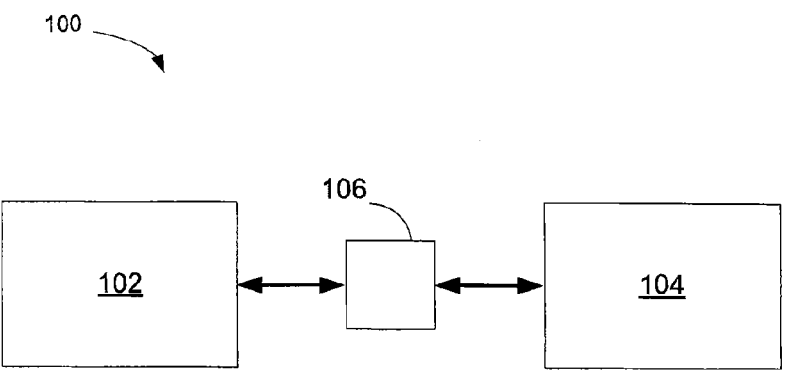
FIG. 1 illustrates an example system for reducing power consumption on multi-transmitter devices configured in accordance with an example embodiment.

The following presents a simplified overview of the example embodiments in order to provide a basic understanding of some aspects of the example embodiments. This overview is not an extensive overview of the example embodiments. It is intended neither to identify key or critical elements of the example embodiments nor to delineate the scope of the appended claims. Its sole purpose is to present some concepts of the example embodiments in a simplified form as a prelude to the more detailed description that is presented later.

In accordance with an example embodiment, there is disclosed herein an apparatus comprising a first transmitter, a second transmitter, and logic coupled to the first transmitter and the second transmitter. The logic is operable to limit the time period the first transmitter is able to transmit while the second transmitter is transmitting.

In accordance with an example embodiment, there is disclosed herein a method comprised of determining whether a first transmitter is transmitting. The time period a second transmitter is able to transmit while a first transmitter is transmitting is limited if it is determined the first transmitter is transmitting.

DESCRIPTION OF EXAMPLE EMBODIMENTS

This description provides examples not intended to limit the scope of the appended claims. The figures generally indicate the features of the examples, where it is to be understood and appreciated that like reference numerals are used to refer to like elements. Reference in the specification to "one embodiment," "an embodiment," or "an example embodiment" means that a particular feature, structure, or characteristic is included in at least one embodiment described herein and does not imply that the feature, structure, or characteristic is present in all embodiments described herein.

FIG. 1 illustrates an example system 100 for reducing power consumption on multi-transmitter devices configured in accordance with an example embodiment. System 100 includes first transmitter 102 and second transmitter 104. Logic 106 is coupled to first transmitter 102 and second transmitter 104. "Logic," as used herein, includes but is not limited to hardware, firmware, software, and/or combinations of each to perform a function(s) or an action(s) and/or to elicit a function or action from another component. For example, based on a desired application or need, logic may include a software controlled microprocessor, discrete logic such as an application specific integrated circuit (ASIC), a programmable and/or programmed logic device, a memory device containing instructions or the like, or combinational logic embodied in hardware. Logic may also be fully embodied as software. In the example illustrated in FIG. 1, logic 106 is shown as being coupled between transmitters 102, 104; however, in an example embodiment, logic 106 is embedded within each of transmitters 102, 104 (see e.g. control logic 426, 446 in FIG. 4).

In operation, logic 106 is configured to limit the amount of time that both transmitters can transmit simultaneously. For example, if first transmitter 102 is transmitting, logic 106 limits the amount of time that second transmitter 104 can transmit while first transmitter 102 is transmitting. Similarly, if second transmitter 104 is transmitting, logic 106 can limit the amount of time first transmitter 102 can transmit while second transmitter 104 is transmitting.

In particular embodiments, one of transmitters 102, 104 may be prioritized. For example, if transmitter 102 is prioritized, anytime transmitter 102 begins transmitting, transmitter 104 stops transmitting or transmits for a limited amount of time, as described herein, while transmitter 102 is transmitting.

In accordance with an example embodiment, the amount of time that logic 106 allows transmitters 102, 104 to transmit at the same time depends on the time constant of a power supply (not shown, see e.g. power supply 414 in FIG. 4) providing power to transmitters 102, 104. For example, a power supply may have reactive components such as capacitors and inductors that store energy and can provide power for a short period of time while the input of the power supply increases. Moreover, the power supply may also be a switching power supply (see. for example, power supply 414 in FIG. 4) having a duty cycle. For example, a 100 kHz power supply having a duty cycle of 10 microseconds may take 100 microseconds to reach full power (e.g. the input power of the power supply matches the power being used by transmitters 102,104 after the second transmitter begins transmitting). Thus, logic 106 can allow transmitter 104 to transmit frames that can be transmitted in less than 100 microseconds while transmitter 102 is transmitting.

Figure 2:
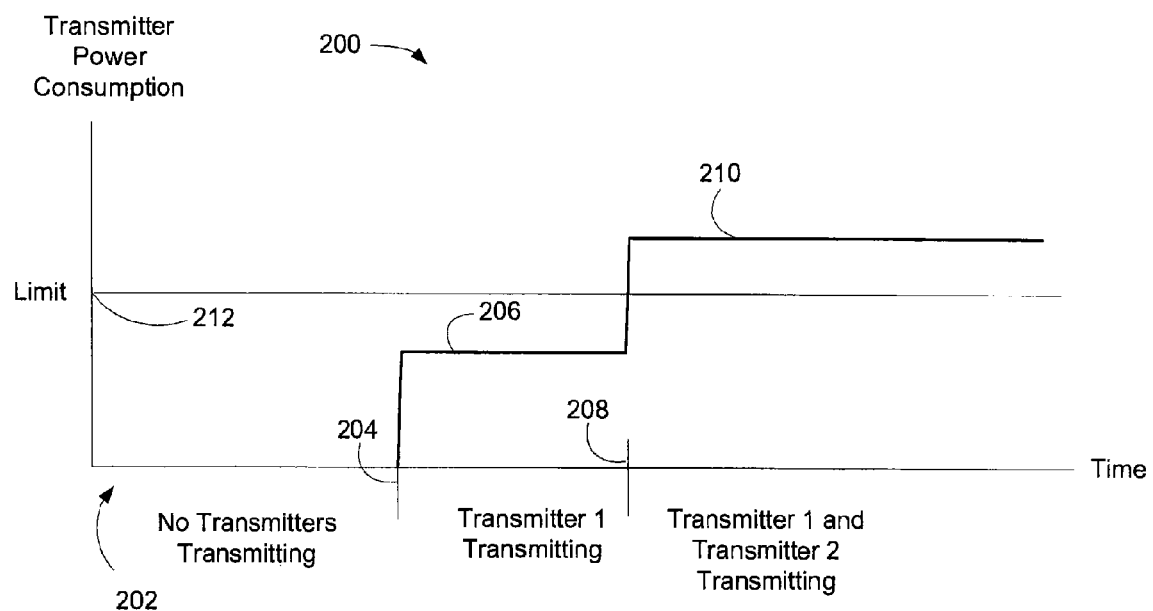
FIG. 2 illustrates an example power curve of power consumed by the transmitters of a multi-transmitter device.
Figure 3:
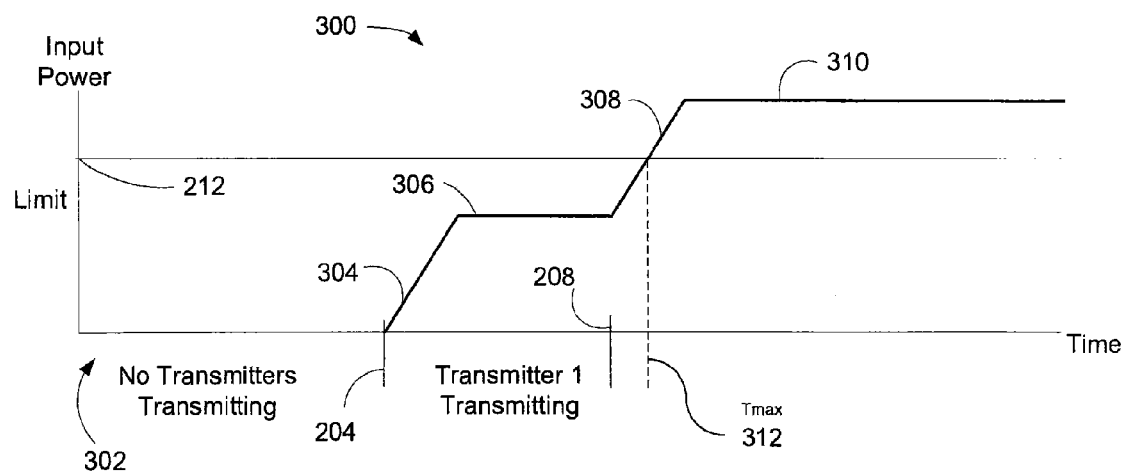
FIG. 3 illustrates an example power curve of a power supply providing power to the multi-transmitter device described in FIG. 1 corresponding to the power curve of FIG. 2.

For example, FIG. 2 and FIG. 3, with continued reference to FIG. 1, illustrate example power curves 200, 300 respectively of a multi-transmitter device. Power curve 200 illustrates power consumed by transmitters 102, 104 at a given point in time, while power curve 300 illustrates the power curve of a power supply providing power to transmitters 102, 104. During time period 202, no transmitters are transmitting. Therefore, no power is being consumed by transmitters 102, 104 and, as illustrated by time period 302, the input power is at a first constant level.

At 204, a first transmitter (e.g. transmitter 102) begins to transmit. The power consumed by the first transmitter is illustrated at 206. As can be observed in FIG. 3, the input power to the power supply begins to rise as illustrated at 304 until reaching the appropriate power level 306 for supplying power to the first transmitter.

At 208, the second transmitter (e.g. transmitter 104) begins transmitting. The power level consumed when both the first transmitter and second transmitter are transmitting is represented by 210. The limit for power consumption, which is lower than power level 210, is represented by 212. As can be observed from FIG. 3, the power supply's power level increases, as represented by 308, until reaching power level 310. From time 208 until the time represented by Tmax 312, the input power level is below limit 212. Therefore, frames that can be transmitted in a time period that is less than or equal to the time period from 208 to 312 can be transmitted by the second transmitter while the first transmitter is transmitting without exceeding the power supply's limits. Moreover, in particular embodiments, the time period that both transmitters can be transmitting can be longer than the time period from 208 to 312. For example, the IEEE 802.3af-2003 specification allows peak power to exceed the maximum limit (e.g. limit 212) for up to 50 milliseconds and 5% duty cycle.

In an example embodiment, the limited time period for which the second transmitter 104 is able to transmit while the first transmitter 102 is transmitting is based on the size of the packet to be transmitted. For example, the second transmitter 104 may be limited to transmitting packets that are less than a predefined number of bytes. In one example, the predefined number of bytes may be based on IEEE defined standards for 802.11 wireless communication. In another example embodiment, the limited time period for which the second transmitter 104 is able to transmit while the first transmitter 102 is transmitting is based on the data rate and the size of the packet to be transmitted.

In an example embodiment, second transmitter 104 is limited to transmitting control frames while first transmitter 102 is transmitting. Similarly, first transmitter 102 is limited to transmitting control frames while second transmitter 104 is transmitting. In one example, the control frame may be an acknowledgement (ACK) frame. Thus, even though transmitters 102 and 104 may, at certain times, be limited in their ability to transmit large data packets, receivers (not shown, see e.g. FIG. 4) associated with transmitters 102, 104 may nevertheless continue to receive data packets and send acknowledgements to the senders of the data packets. This helps prevent a sender from potentially sending a data packet multiple times because an acknowledgement was not received, which would unnecessarily consume channel bandwidth. In another example, the control frame may be a Clear to Send frame (CTS). Similarly, as defined in the IEEE 802.11 specification, a control frame may be a Request to Send (RTS), PS-Poll, CF-End, or BlockAck frame. In addition, other frames, such as probe response frames and/or management frames, may also be transmitted, provided they can be sent within the limited time constraints.

In an example embodiment, first transmitter 102 and second transmitter 104 are coupled to a common power supply. For example, the two transmitters 102, 104 may be coupled to a common Power-over-Ethernet (PoE) power supply. In particular embodiments, the power supply may be a switched power supply (e.g. a 100 kHz power supply). The power supply may suitably comprise reactive components, such as capacitors and inductors, which may allow the input of the power supply to lag behind the output of the supply when power consumption is increased at the output of the power supply.

In an example embodiment, first transmitter 102 and second transmitter 104 employ non-overlapping frequencies. In one example, first transmitter 102 operates on 2.4 GHz, while second transmitter 104 operates on 5 GHz.

An aspect of an example embodiment described herein is that it enables multiple transmitting devices to simultaneously have transmit capability enabled without reducing transmitter power levels. This can obviate problems encountered with reducing transmitter power levels and can provide better data rates and/or throughput for a given range around the transmitters, while still employing a power supply having a lower power level than the power consumed when multiple transmitters are transmitting.

Figure 4:
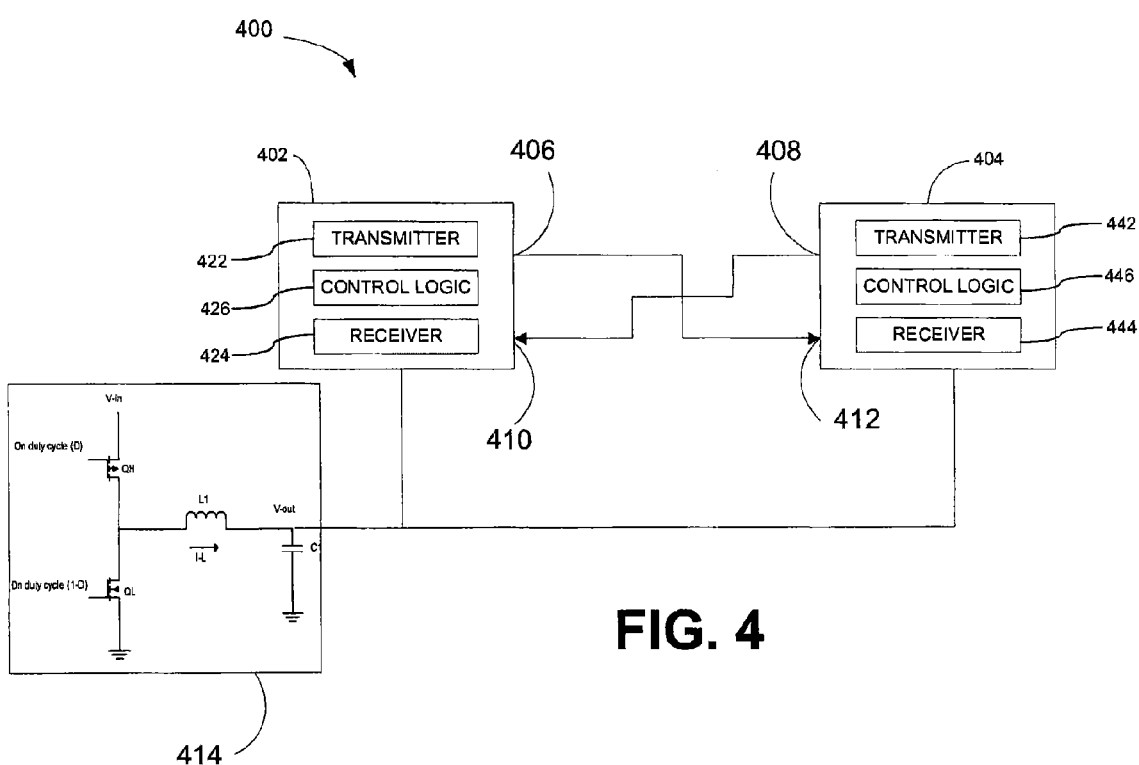
FIG. 4 illustrates an example of a multi-transceiver device configured in accordance with an example embodiment.

FIG. 4 illustrates a multi-transceiver device 400 configured in accordance with an example embodiment. Multi-transceiver device 400 comprises a first transceiver 402 that has a first transmitter 422, first receiver 424, and first control logic 426 and a second transceiver 404 having a second transmitter 442, a second receiver 444, and second control logic 446. Transceivers 402, 404 are coupled to power supply 414.

In an example embodiment, power supply 414 receives power via Power-over-Ethernet (PoE). In particular embodiments, power supply 414 is a switching power supply. The supply illustrated is a buck converter; however, the same concepts described herein can be applied to either isolated forward or flyback converters, as well as non-isolated buck converters. For example, a switch power supply may suitably comprise two transistors QH, QL, wherein QH is coupled to an input power supply (provided by V-in) and a common (e.g. ground). An inductor L1 is coupled between transistors QH, QL, and a capacitor C1 is coupled across transistor QL. The voltage across capacitor C1 is the output voltage (V-out) of the supply.

In operation, during a first portion of a duty cycle, transistor QH is switched on, while transistor QL is switched off. During a second portion of the duty cycle, transistor QL is switched on, while transistor QH is switched off. If the first portion of the duty cycle is represented as D, the on duty cycle for transistor QH is D, while the on duty cycle for transistor QL is 1-D. The inductance for inductor L1 and capacitance of C1 determine the time constant of the power supply (e.g. the amount of time lag from when both transmitters switch on until the input power of the power supply catches up).

First transceiver 402 has an output 406 which indicates when first transmitter 422 is transmitting. Output 406 is coupled to input 412 of second transceiver 404. When second transmitter 442 is ready to transmit, second control logic 446 checks input 412. If second control logic 446 detects a low signal on input 412 indicating that first transmitter 422 is not transmitting, second transmitter 442 proceeds with transmitting all data packets. If second control logic 446 detects a high signal on input 412 indicating that first transmitter 422 is transmitting, second transmitter 442 transmits only for a limited time period. Similarly, second transceiver 404 has an output 408, which indicates when second transmitter 442 is transmitting. Output 408 is coupled to input 410 of first transceiver 402. When first transmitter 422 is ready to transmit, first control logic 426 checks the input signal 410 and proceeds with transmitting all data packets if the input signal indicates second transmitter 442 is off. If input signal 410 indicates second transmitter 442 is transmitting, first transmitter 422 is constrained to transmitting only for a limited time period.

In an example embodiment, the limited time period for which the second transmitter 442 is able to transmit while the first transmitter 422 is transmitting is based on the size of the packet to be transmitted. In another example embodiment, the limited time period for which the second transmitter 442 is able to transmit while the first transmitter 422 is transmitting is based on the data rate and the size of the packet to be transmitted.

In an example embodiment, first transmitter 422 is limited to transmitting control frames while control logic 426 detects a signal on input 410 indicating second transmitter 442 is transmitting. Similarly, second transmitter 442 is limited to transmitting control frames while control logic 446 detects a signal on input 412 indicating transmitter 422 is transmitting. In a particular embodiment, the control frame may be an acknowledgement (ACK) frame and/or a Clear to Send frame (CTS).

In an example embodiment, first transmitter 422 and second transmitter 442 employ non-overlapping frequencies. In one example, first transmitter 422 operates on 2.4 GHz, while second transmitter 442 operates on 5 GHz.

Device 400 can help prevent channel usage degradation. For example, while first transmitter 422 is transmitting on a first frequency, receiver 444 can receive a frame on a second frequency. Even though first transmitter 422 is transmitting, transmitter 442 can send an acknowledgement (ACK) frame on the second frequency responsive to the frame received by receiver 444. If second transmitter 442 does not send an ACK, the source (not shown) of the frame on the second frequency will resend the frame, which unnecessarily wastes channel bandwidth.

Figure 5:
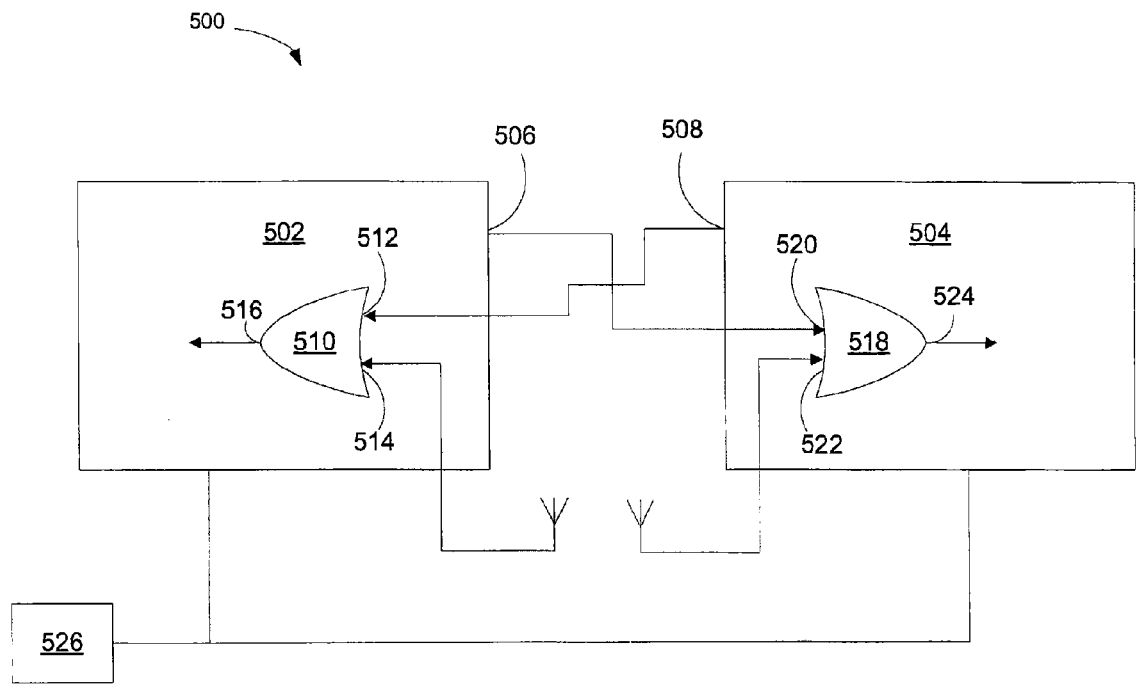
FIG. 5 illustrates an example of a multi-transmitter device employing logic gates.

FIG. 5 illustrates an example system 500 for reducing power consumption on multi-transmitter devices configured in accordance with an example embodiment. First transmitter 502 and second transmitter 504 are coupled to power supply 526. In one example embodiment, power supply 526 receives power via Power-over-Ethernet (PoE). In particular embodiments, power supply 526 is a switching power supply.

First transmitter 502 obtains a clear channel assessment signal from output 516 of logic gate 510 (an OR gate in this example; however, one skilled in the art should appreciate that suitable functionality may be obtained from other types of gates, such as NAND, NOR, etc.). Logic gate 510 receives a first input 512 (referred to herein as a logical Clear Channel Assessment "CCA") from output 508 of transmitter 504 that indicates whether transmitter 504 is transmitting. Logic gate 510 receives a second input 514 that indicates whether the physical channel is clear (referred to herein as a physical CCA). If either the physical CCA signal or the logical CCA signal is asserted, then first transmitter 502 receives an indication via output 516 and limits transmission of signals. For example, while a signal is asserted on output 516, first transmitter 502 may be limited to sending control signals. In particular embodiments, first transmitter 502 may also send signals that can be sent within a predetermined time period and/or management frames. In still other embodiments, first transmitter 502 can determine which signals it may send, depending on whether the physical CCA or logical CCA is asserted. For example, if the physical CCA signal is asserted, then only control frames will be sent, whereas if only the logical CCA is asserted, any signal that can be sent within a predetermined time frame (for example, the time period represented by time between time 208 and Tmax in FIG. 3) may be sent.

Similarly, second transmitter 504 obtains a clear channel assessment signal from output 524 of logic gate 518. Logic gate 518 receives a first input 520 (logical CCA) from output 506 of transmitter 502 that indicates whether transmitter 502 is transmitting. Logic gate 518 receives the physical CCA on second input 522. If either the physical CCA signal or the logical CCA signal is asserted, then second transmitter 504 receives an indication via output 524 and limits transmission of signals. For example, while a signal is asserted on output 524, second transmitter 504 may be limited to sending control signals. In particular embodiments, second transmitter 504 may also send signals that can be sent within a predetermined time period and/or management frames. In still other embodiments, second transmitter 504 can determine which signals it may send depending on whether the physical CCA or logical CCA is asserted. For example, if the physical CCA signal is asserted, then only control frames will be sent, whereas if only the logical CCA is asserted, any signal that can be sent within a predetermined time frame (for example, the time period represented by time between time 208 and Tmax in FIG. 3) may be sent.

Figure 6:
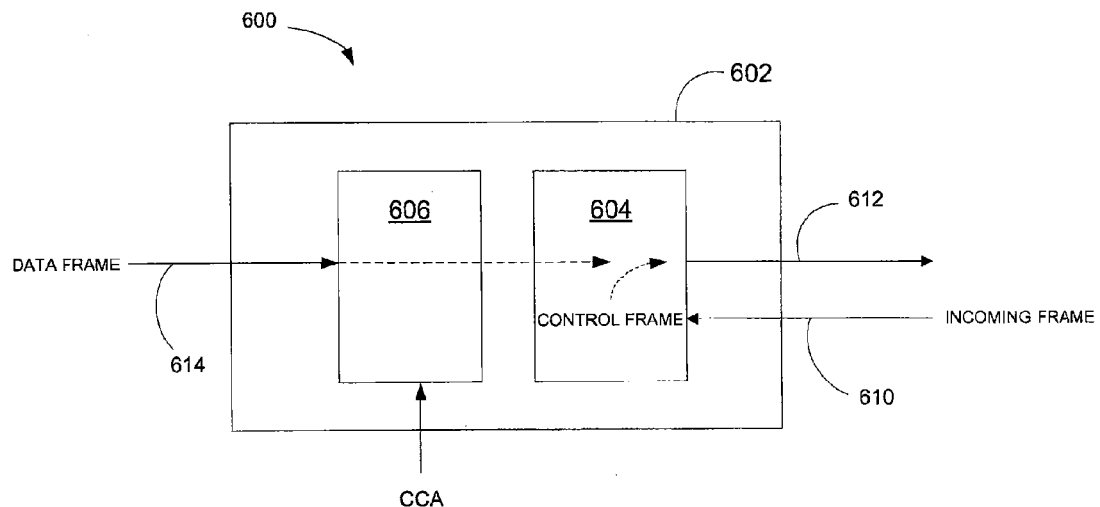
FIG. 6 illustrates an example block diagram of upper and lower Medium Access Control (MAC) logic configured in accordance with an example embodiment.

FIG. 6 illustrates an example block diagram of upper and lower Medium Access Control (MAC) logic 600 configured in accordance with an example embodiment. Transmitter 602 comprises a lower Medium Access Controller (MAC) 604 and an upper MAC 606. During normal operation, Lower. MAC 604 receives an incoming frame via communication link 610. Lower MAC 604 transmits control frames via communication link 612 in response to receiving an incoming frame. Although the illustration shows the incoming and outgoing frame on different interfaces 610, 612, this is done merely for ease of illustration, as those skilled in the art should readily appreciate that frames are generally sent and received on the same interface. Upper MAC 606 receives data frames via communication link 614. Upper MAC 606 also receives an input indicating a Clear Channel Assessment (CCA). The CCA input may be configured as illustrated in FIG. 5, where the CCA input indicates whether the channel is available (physical CCA) or whether another transmitter (not shown, see e.g. FIG. 1) is transmitting (logical CCA). If the CCA is set, then upper MAC 606 does not send the data frame to lower MAC 604 but holds the frame until the CCA is clear. In an example embodiment, upper MAC 606 may send a data frame to lower MAC 604 if the frame can be sent within a predetermined time period.

Although the descriptions herein illustrate two transmitters, those skilled in the art should readily appreciate that the number of transmitters in the illustrated embodiments were selected merely for ease of illustration and that the principles described herein are suitably adaptable to any number of transmitters. For example, the logic illustrated herein may be coupled to more than two transmitters and may be configured to limit the time period a transmitter is able to transmit if it is determined that one or more of a group of transmitters is transmitting.

Figure 7:
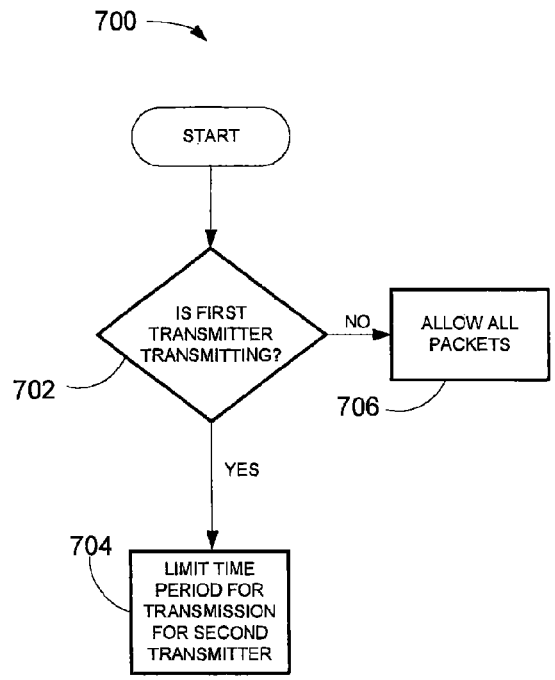
FIG. 7 is a block diagram of a methodology for reducing power consumption on multi-transmitter devices in accordance with an example embodiment.
Figure 8:
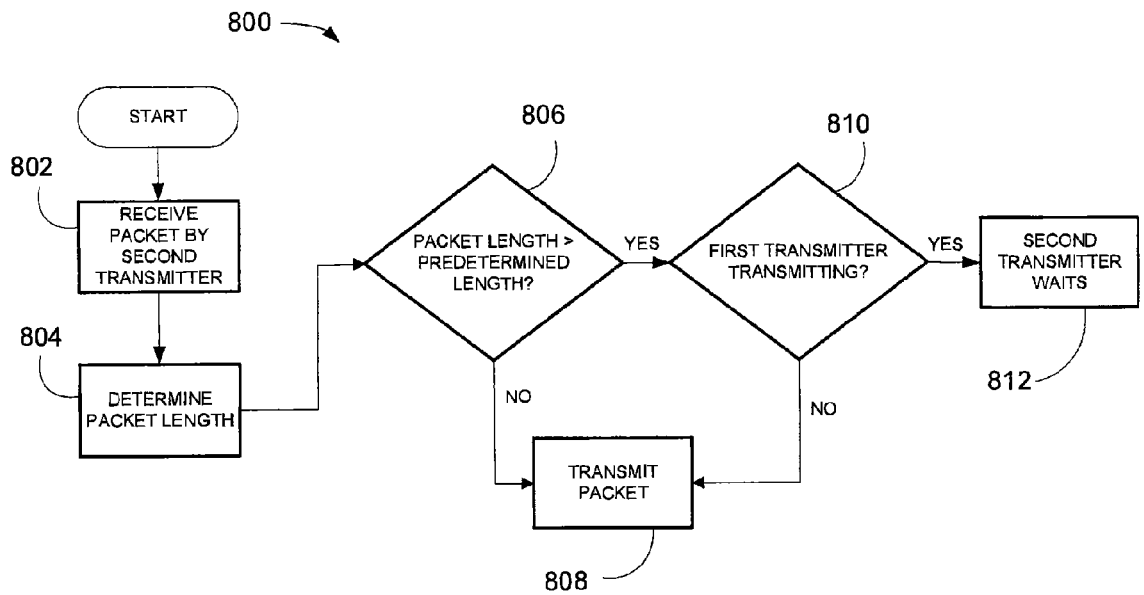
FIG. 8 is a block diagram of a methodology for reducing power consumption on multi-transmitter devices in accordance with an example embodiment.

In view of the foregoing structural and functional features described above, a methodology in accordance with an example embodiment will be better appreciated with reference to FIGS. 7-8. While, for purposes of simplicity of explanation, the methodologies of FIGS. 7-8 are shown and described as executing serially, it is to be understood and appreciated that the example embodiment is not limited by the illustrated order, as some aspects could occur in different orders and/or concurrently with other aspects from those shown and described herein. Moreover, not all illustrated features may be required to implement a methodology in accordance with an aspect of the example embodiment. The methodologies described herein are suitably adapted to be implemented in hardware, software, or a combination thereof.

FIG. 7 is a block diagram, in accordance with an example embodiment, of a methodology 700 for reducing power consumption on multi-transmitter devices having at least a first transmitter coupled to a second transmitter. At 702, it is determined whether a first transmitter is transmitting. If at 702 it is determined that the first transmitter is transmitting (YES), at 704 the time period that the second transmitter is able to transmit is limited. If it is determined at 702 that the first transmitter is not transmitting (NO), the second transmitter is allowed to transmit all data packets at step 706.

In an example embodiment, limiting the time period a second transmitter is able to transmit while the first transmitter is transmitting at step 704 is based on a size of a packet to be transmitted. In one example, the size of the packet to be transmitted by the second transmitter is divided by the data rate of the second transmitter. If the resulting time is less than a predefined limit, the second transmitter will transmit the packet. Otherwise, the second transmitter will wait.

In an example embodiment, the second transmitter is limited to transmitting control frames at step 704 while the first transmitter is transmitting. In one example, the control frame is an acknowledgement frame. In one example, the control frame is a Clear to Send frame (CTS).

In an example embodiment, the first transmitter of step 702 and the second transmitter of step 704 are coupled to the same power supply. For example, the two transmitters may be coupled to the same Power-over Ethernet (PoE).

In an example embodiment, the first transmitter of step 702 and the second transmitter of step 704 employ non-overlapping frequencies. In one example, the first transmitter operates on 2.4 GHz, and the second transmitter operates on 5 GHz.

FIG. 8 is a block diagram, in accordance with an example embodiment, of a methodology 800 for reducing power consumption on multi-transmitter devices having at least a first transmitter and a second transmitter coupled to a common power source. At 802, a packet is received by a second transmitter. At 804, the length of the packet is determined. If, at step 806, it is determined that the length of the packet is less than a predetermined length (NO), the packet is transmitted at step 808 by the second transmitter. If it is determined at step 806 that the length of the packet is greater than a predetermined length (YES), the packet is only transmitted at step 808 by the second transmitter if it is first determined at 810 that the first transmitter is not transmitting (NO). If it is determined at step 810 that the first transmitter is transmitting (YES), the second transmitter waits at step 812. In one example, the packet will be sent after the first transmitter is done transmitting.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications, and variations that fall within the spirit and scope of the appended claims interpreted in accordance with the breadth to which they are fairly, legally, and equitably entitled.

The invention claimed is:

1. An apparatus, comprising:
a power supply having a predetermined limit;
a first transceiver operatively coupled with the power supply, the first transceiver comprising a first receiver and a first transmitter;
a second transceiver operatively coupled with the power supply, the second transceiver comprising a second receiver and a second transmitter; and
logic operatively coupled with the first transceiver and the second transceiver;
wherein the logic is operable to receive at least a first signal, the first signal comprising data representative of a transmitting status of the first transmitter;
wherein, in response to the received transmission status, the logic is operable to determine whether the first transmitter is transmitting; and
wherein, in response to a determination that the first transmitter is transmitting, the logic is operable to selectively allow the second transmitter to transmit while the first transmitter is transmitting, where the power consumption of the first transmitter and the second transmitter exceeds the predetermined limit for a limited time based on a characteristic of the power supply.

2. The apparatus set forth in claim 1, wherein the logic is operable to selectively allow the second transmitter to transmit while the first transmitter is transmitting by selectively limiting a time period the second transmitter is able to transmit while the first transmitter is transmitting.

3. The apparatus set forth in claim 1, wherein the logic is operable to selectively allow the second transmitter to transmit while the first transmitter is transmitting by selectively limiting the second transmitter to transmit one or more data packets based on a size of a data packet to be transmitted.

4. The apparatus set forth in claim 1,
wherein the logic is further operable to receive a second signal, the second signal comprising data representative of a transmission availability status of an associated frequency on which the second transmitter is operable to transmit;

wherein, in response to a receiving the transmission availability status of the associated frequency, the logic is operable to determine if the associated frequency is clear for transmission by the second transmitter; and wherein, in response to a determination as to the availability of the associated frequency for transmission, the logic is operable to selectively allow the second transmitter to transmit while the first transmitter is transmitting.

5. The apparatus set forth in claim 1, wherein the first signal comprises a logical clear channel assessment signal.

6. The apparatus set forth in claim 5, wherein, in response to a determination that the first transmitter is transmitting, the logic is operable to selectively limit a time period the second transmitter is able to transmit while the first transmitter is transmitting.

7. The apparatus set forth in claim 4, wherein the second signal comprises a physical clear channel assessment signal.

8. The apparatus set forth in claim 7, wherein, in response to a determination that the associated frequency is not clear for transmissions by the second transmitter, the logic is operable to selectively limit the second transmitter to transmit one or more data packets based on a size of a data packet to be transmitted.

9. The apparatus set forth in claim 7, wherein in response to a determination that the associated frequency is not clear for transmissions by the second transmitter, the logic is operable to selectively limit the second transmitter to transmit one or more control frames.

10. A method comprising:
determining a limit for a power supply coupled with a first transceiver comprising a first transmitter and a first receiver, and a second transceiver comprising a second transmitter and a second receiver;
receiving at least a first signal, the first signal comprising data representative of a transmitting status of the first transmitter;
in response to the received transmission status, determining whether the first transmitter is transmitting; and
in response to a determination that the first transmitter is transmitting, selectively allowing the second transmitter to transmit while the first transmitter is transmitting,
wherein the first transmitter and second transmitter are operatively coupled with a common power supply having a limit,
wherein a combined power consumption of the first transmitter and the second transmitter exceeds the limit for the power supply for a limited time, and
wherein the limited time is based on at least one characteristic of the power supply.

11. The method set forth in claim 10, wherein selectively allowing the second transmitter to transmit while the first transmitter is transmitting comprises selectively limiting a time period the second transmitter is able to transmit while the first transmitter is transmitting.

12. The apparatus set forth in claim 10, wherein selectively allowing the second transmitter to transmit while the first transmitter is transmitting comprises selectively limiting the second transmitter to transmit one or more data packets based on a size of a data packet to be transmitted.

13. The method set forth in claim 10, further comprising:
receiving a second signal, the second signal comprising data representative of a transmission availability status of an associated frequency on which the second transmitter is operable to transmit;
in response to a receiving the transmission availability status of the associated frequency, determining if the associated frequency is clear for transmission by the second transmitter; and
in response to a determination as to the availability of the associated frequency for transmission, selectively allowing the second transmitter to transmit while the first transmitter is transmitting.

14. The method set forth in claim 10, wherein the first signal comprises a logical clear channel assessment signal.

15. The method set forth in claim 14, wherein, in response to a determination that the first transmitter is transmitting, selectively limiting a time period the second transmitter is able to transmit while the first transmitter is transmitting.

16. The method set forth in claim 13, wherein the second signal comprises a physical clear channel assessment signal.

17. The method set forth in claim 16, wherein, in response to a determination that an associated frequency is not clear for transmissions by the second transmitter, selectively limiting the second transmitter to transmit one or more data packets based on a size of a data packet to be transmitted.

18. The apparatus set forth in claim 16, wherein in response to a determination that an associated frequency is not clear for transmissions by the second transmitter, selectively limiting the second transmitter to transmit one or more control frames.

19. An apparatus, comprising:
a power supply having a predetermined limit;
a first transceiver operatively coupled with the power supply, the first transceiver comprising a first receiver and a first transmitter;
a second transceiver operatively coupled with the power supply, the second transceiver comprising a second receiver and a second transmitter;
means for receiving at least a first signal, the first signal comprising data representative of a transmitting status of the first transmitter;
in response to the received transmission status, means for determining whether the first transmitter is transmitting; and
in response to a determination that the first transmitter is transmitting, means for selectively allowing the second transmitter to transmit while the first transmitter is transmitting, where the power consumption of the first transmitter and the second transmitter exceeds the predetermined limit for a limited time based on a characteristic of the power supply.

20. The apparatus set forth in claim 19, further comprising:
means for receiving a second signal, the second signal comprising data representative of a transmission availability status of an associated frequency on which the second transmitter is operable to transmit;
in response to a receiving the transmission availability status of the associated frequency, means for determining if the associated frequency is clear for transmission by the second transmitter; and
in response to a determination as to the availability of the associated frequency for transmission, means for selectively allowing the second transmitter to transmit while the first transmitter is transmitting.

* * * * *